(12) United States Patent
Berhane et al.

(10) Patent No.: US 12,301,274 B2
(45) Date of Patent: *May 13, 2025

(54) RADIO-FREQUENCY FRONT END MODULES WITH LEAKAGE MANAGEMENT ENGINES

(71) Applicant: Apple Inc., Cupertino, CA (US)

(72) Inventors: Danyom Berhane, San Jose, CA (US); Brian B. Whitaker, Los Gatos, CA (US); Mohammad B. Vahid Far, San Jose, CA (US); Tracey L Chavers, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/900,725

(22) Filed: Aug. 31, 2022

(65) Prior Publication Data

US 2022/0416838 A1    Dec. 29, 2022

Related U.S. Application Data

(63) Continuation of application No. 16/988,537, filed on Aug. 7, 2020, now Pat. No. 11,539,393.

(51) Int. Cl.
  *H04B 1/525*    (2015.01)
  *H04B 1/04*    (2006.01)
  *H04B 1/44*    (2006.01)

(52) U.S. Cl.
  CPC ........... *H04B 1/525* (2013.01); *H04B 1/0458* (2013.01); *H04B 1/44* (2013.01); *H04B 2001/0408* (2013.01)

(58) Field of Classification Search
  CPC ........ H04B 1/44; H04B 1/525; H04B 1/0458; H04B 2001/0408
  See application file for complete search history.

(56) References Cited

U.S. PATENT DOCUMENTS 8,085,834 B2    12/2011    Hanke et al.
8,284,721 B2 *  10/2012    Chen ..................... H04B 1/406
                                        370/465

(Continued)

FOREIGN PATENT DOCUMENTS

CN    1925653 A    3/2007
CN    101324802 A    12/2008

(Continued)

*Primary Examiner* — Nguyen T Vo
(74) *Attorney, Agent, or Firm* — Treyz Law Group, P.C.; Michael H. Lyons; Tianyi He

(57) ABSTRACT

An electronic device may include a transceiver, an antenna, and a front end module (FEM) coupled between the transceiver and antenna. Components on the FEM may operate on radio-frequency signals. The FEM may include a digital controller with a leakage management engine. The leakage management engine may monitor power supply voltages received by the FEM. In response to detection of a trigger condition, the leakage management engine may power off a set of the components while at least some of the FEM remains powered on. The trigger condition may be a change in the power supply voltages or a host command received from a host processor. Using the leakage management engine to power off the set of front end components may serve to minimize leakage current on the FEM, thereby maximizing battery life and shelf life for the device, without the use of bulky and expensive external load switches.

20 Claims, 8 Drawing Sheets

(56) References Cited

U.S. PATENT DOCUMENTS

| | | | |
|---|---|---|---|
| 8,995,929 B2* | 3/2015 | Chen | H04W 8/22 |
| | | | 370/252 |
| 9,020,454 B2 | 4/2015 | Waheed et al. | |
| 9,049,065 B2 | 6/2015 | Barriac et al. | |
| 9,219,596 B2 | 12/2015 | Mikhemar et al. | |
| 9,391,665 B2 | 7/2016 | Niskanen et al. | |
| 10,261,563 B1* | 4/2019 | Venugopal | G06F 1/3206 |
| 10,499,340 B1 | 12/2019 | Lin et al. | |
| 10,629,553 B2 | 4/2020 | Soliman et al. | |
| 10,644,856 B2 | 5/2020 | Chatterjee et al. | |
| 11,036,262 B1 | 6/2021 | Ichitsubo et al. | |
| 2002/0028701 A1* | 3/2002 | Satoh | H04W 52/0277 |
| | | | 455/574 |
| 2006/0053321 A1* | 3/2006 | Mizusawa | H03F 1/02 |
| | | | 713/300 |
| 2006/0063555 A1* | 3/2006 | Robbins | H04B 1/1615 |
| | | | 514/69 |
| 2008/0046542 A1* | 2/2008 | Sano | H04W 36/14 |
| | | | 709/218 |
| 2015/0046324 A1* | 2/2015 | de la Cropte de Chanterac | |
| | | | G06Q 20/36 |
| | | | 705/41 |
| 2018/0076837 A1* | 3/2018 | Torre | H04B 1/18 |
| 2018/0110008 A1* | 4/2018 | Lin | H04W 52/0261 |
| 2018/0199284 A1* | 7/2018 | Lai | H04W 52/028 |
| 2018/0219563 A1* | 8/2018 | Törmänen | H04B 7/0413 |
| 2018/0226367 A1 | 8/2018 | Babcock et al. | |
| 2019/0097631 A1* | 3/2019 | Lim | H03K 19/0008 |
| 2019/0103767 A1 | 4/2019 | Lethellier | |
| 2019/0214720 A1 | 7/2019 | Trocke et al. | |
| 2019/0261274 A1 | 8/2019 | Huang et al. | |
| 2019/0306923 A1 | 10/2019 | Xiong et al. | |
| 2020/0007200 A1 | 1/2020 | Schreck et al. | |
| 2020/0132829 A1 | 4/2020 | Jiang et al. | |
| 2020/0220506 A1 | 7/2020 | Choi et al. | |
| 2020/0314747 A1* | 10/2020 | Zhou | H04L 5/0053 |
| 2021/0243286 A1 | 8/2021 | Migliorino et al. | |
| 2022/0103193 A1* | 3/2022 | Pehlke | H04B 17/102 |
| 2022/0104198 A1 | 3/2022 | Balasubramanian et al. | |
| 2022/0149611 A1 | 5/2022 | Madonna et al. | |
| 2022/0345987 A1* | 10/2022 | Gopal | H04L 5/0051 |
| 2022/0381898 A1* | 12/2022 | Zhang | G06F 3/011 |

FOREIGN PATENT DOCUMENTS

| | | |
|---|---|---|
| CN | 101681671 A | 3/2010 |
| CN | 102271002 A | 12/2011 |
| CN | 104980173 A | 10/2015 |
| CN | 107210711 A | 9/2017 |
| DE | 102019100164 A1 | 7/2019 |
| KR | 20060127070 A | 12/2006 |
| KR | 100716018 B1 | 5/2007 |
| KR | 20120023782 A | 3/2012 |
| KR | 20170019710 A | 2/2017 |

* cited by examiner

RADIO-FREQUENCY FRONT END MODULES WITH LEAKAGE MANAGEMENT ENGINES

This application is a continuation of U.S. non-provisional patent application Ser. No. 16/988,537, filed Aug. 7, 2020, which is incorporated by reference herein in its entirety.

FIELD

This relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals. Radio-frequency front end modules are coupled between the transceiver circuitry and the antennas.

It can be challenging to form satisfactory radio-frequency front end modules for an electronic device. If care is not taken, leakage current in the front end modules can reduce battery life and shelf life for the electronic device.

SUMMARY

An electronic device may include wireless circuitry for performing wireless communications. The wireless circuitry may include a transceiver, an antenna, and a radio-frequency front end module (FEM) coupled between the transceiver and the antenna. The transceiver may convey radio-frequency signals using the antenna. Front end components on the FEM may operate on the radio-frequency signals. The FEM may be powered by power supply voltages provided by a power system on the electronic device.

The FEM may include a digital controller. A leakage management engine may be formed from logic gates on the digital controller. The leakage management engine may monitor the power supply voltages received by the FEM. The leakage management engine may detect a trigger condition. In response to detection of the trigger condition, the leakage management engine may power off a set of the front end components while at least some of the FEM remains powered on. For example, the leakage management engine may disconnect the set of front end components from one or more of the power supply voltages. The trigger condition may be a change in one or more of the monitored power supply voltages and/or a host command received from a host processor external to the FEM. Using the leakage management engine to power off the set of front end components may serve to minimize leakage current on the FEM, thereby maximizing battery life and shelf life for the device, without the use of bulky and expensive external load switches.

An aspect of the disclosure provides an electronic device. The electronic device can have an antenna. The electronic device can have a transceiver. The transceiver can convey radio-frequency signals using the antenna. The electronic device can have a radio-frequency front end module coupled between the antenna and the transceiver. The radio-frequency front end module can have front end components that operate on the radio-frequency signals. The radio-frequency front end module can have a leakage management engine. The leakage management engine can power off a set of the front end components while at least some of the radio-frequency front end module remains powered on.

An aspect of the disclosure provides a method of operating a radio-frequency front end module. The method can include, with a digital controller on the radio-frequency front end module, operating the radio-frequency front end module in a first operating mode to perform transmit or receive operations. The method can include, with the digital controller, monitoring power supply voltages received at the radio-frequency front end module. The method can include, with the digital controller, in response to a trigger condition, placing the radio-frequency front end module in a second operating mode by decoupling a set of the front end module components from at least one of the power supply voltages.

An aspect of the disclosure provides a non-transitory computer-readable storage medium. The non-transitory computer-readable storage medium can store one or more programs that can be executed by at least one processor on a radio-frequency front end module. The one or more programs can include instructions that, when executed by the at least one processor, cause the at least one processor to monitor a first power supply voltage received by the radio-frequency front end module. The one or more programs can include instructions that, when executed by the at least one processor, cause the at least one processor to decouple, in response to a change in the first power supply voltage, at least one front end module component on the radio-frequency front end module from a second power supply voltage received by the radio-frequency front end module.

DETAILED DESCRIPTION

Figure 1:
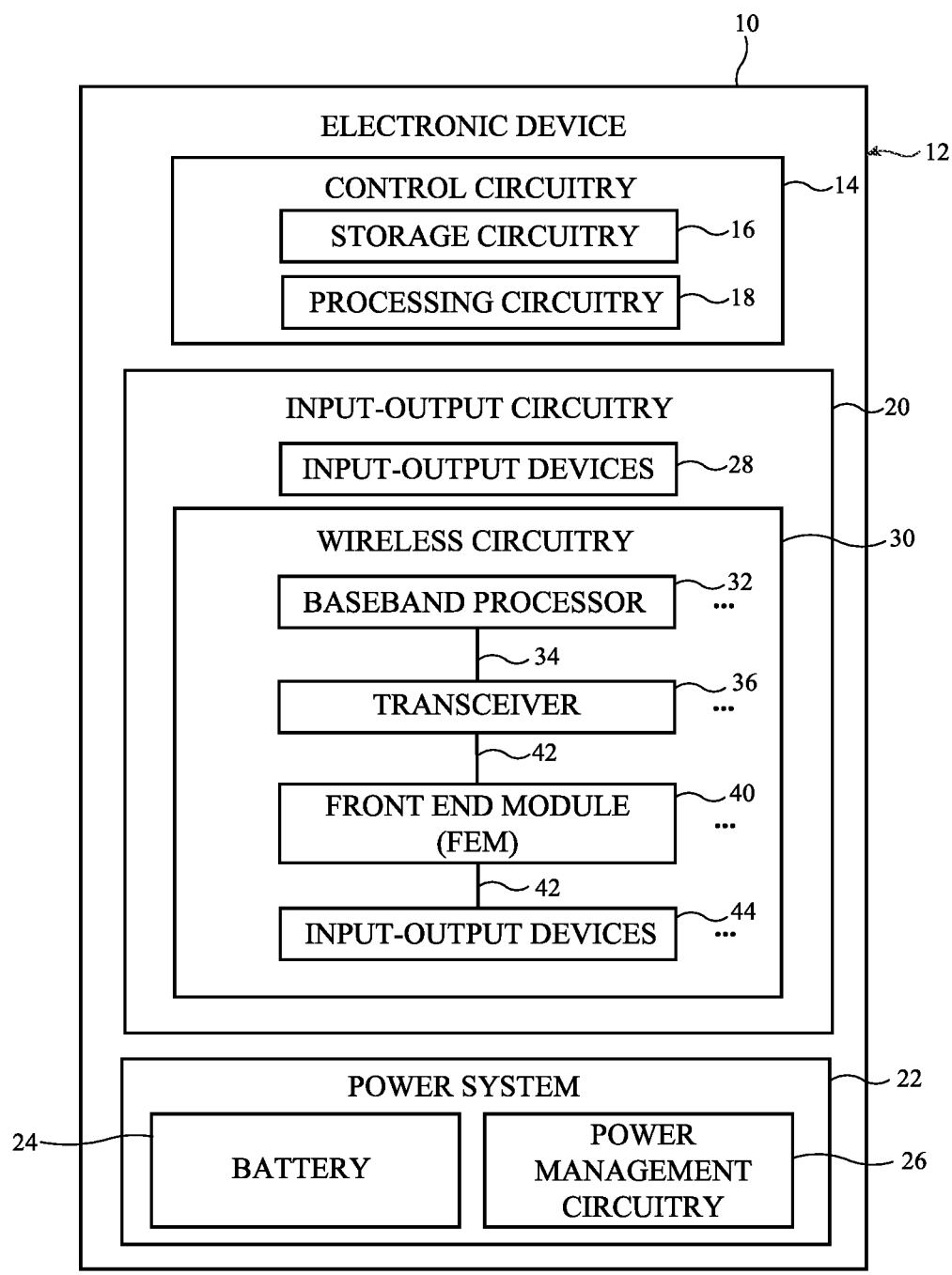
FIG. 1 is a schematic diagram of an illustrative electronic device having wireless circuitry in accordance with some embodiments.

An electronic device such as electronic device 10 of FIG. 1 may be provided with wireless circuitry. The wireless circuitry may include radio-frequency transceiver circuitry and antennas. Radio-frequency front end modules may be coupled between the transceiver circuitry and the antennas. The front end modules may include smart leakage management engines. The smart leakage management engines may be integrated into digital controllers on the front end modules. The smart leakage management engines may monitor the state of the front end modules and power supply voltages provided to the front end modules. The smart leakage management engines may use this information to selectively disable different components on the front end modules. For example, a front end module may have different operating states. The smart leakage management engines may turn off (disable) some or all of the components on the front end module based on one or more of the current states of the front end module, timing requirements for future possible front end module states, and a direct command from an application processor, transceiver, or host software through a driver. This may serve to mitigate current leakage at the front end modules without the use of load switches external to the front end modules. Limiting current leakage in this way may maximize battery life and shelf life for the electronic device.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 28. Input-output devices 28 may be used to allow data to be supplied to device 10 and to allow data to be provided from device 10 to external devices. Input-output devices 28 may include user interface devices, data port devices, and other input-output components. For example, input-output devices 28 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 28 may be peripherals that are coupled to a main processing unit or other portion of device 10 via a wired or wireless link).

Input-output circuitry 20 may include wireless circuitry 30 to support wireless communications. Wireless circuitry 30 (sometimes referred to herein as wireless communications circuitry 30) may include a baseband processor such as baseband processor 32, radio-frequency (RF) transceiver circuitry such as radio-frequency transceiver 36, radio-frequency front end circuitry such as radio-frequency front end module 40, and an antenna 44. Baseband processor 32 may be coupled to transceiver 36 over baseband path 34. Transceiver 36 may be coupled to antenna 44 over radio-frequency transmission line path 42. Radio-frequency front end module 40 may be interposed on radio-frequency transmission line path 42.

In the example of FIG. 1, wireless circuitry 30 is illustrated as including only a single baseband processor, a single transceiver 36, a single front end module 40, and a single antenna 44 for the sake of clarity. In general, wireless circuitry 30 may include any desired number of baseband processors 32, any desired number of transceivers 36, any desired number of front end modules 40, and any desired number of antennas 44. Each baseband processor 32 may be coupled to one or more transceiver 36 over respective baseband paths 34. Each transceiver 36 may be coupled to one or more antenna 44 over respective radio-frequency transmission line paths 42. Each radio-frequency transmission line path 42 may have a respective front end module 40 interposed thereon. If desired, two or more front end modules 40 may be interposed on the same radio-frequency transmission line path 42. If desired, one or more of the radio-frequency transmission line paths 42 in wireless circuitry 30 may be implemented without any front end module interposed thereon.

Radio-frequency transmission line path 42 may be coupled to an antenna feed on antenna 44. The antenna feed may, for example, include a positive antenna feed terminal and a ground antenna feed terminal. Radio-frequency transmission line path 42 may have a positive transmission line signal path such that is coupled to the positive antenna feed terminal on antenna 44. Radio-frequency transmission line path 42 may have a ground transmission line signal path that is coupled to the ground antenna feed terminal on antenna 44. This example is merely illustrative and, in general, antennas 44 may be fed using any desired antenna feeding scheme. If desired, antenna 44 may have multiple antenna feeds that are coupled to one or more radio-frequency transmission line paths 42.

Radio-frequency transmission line path 42 may include transmission lines that are used to route radio-frequency antenna signals within device 10. Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 42 may be integrated into rigid and/or flexible printed circuit boards. In one suitable arrangement, radio-frequency transmission line paths such as radio-frequency transmission line path 42 may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

In performing wireless transmission, baseband processor 32 may provide baseband signals to transceiver 36 over baseband path 34. Transceiver 36 may include circuitry for converting the baseband signals received from baseband processor 32 into corresponding radio-frequency signals. For example, transceiver circuitry 36 may include mixer circuitry for up-converting the baseband signals to radio-frequencies prior to transmission over antenna 44. Transceiver circuitry 36 may also include digital to analog converter (DAC) and/or analog to digital converter (ADC) circuitry for converting signals between digital and analog domains. Transceiver 36 may transmit the radio-frequency signals over antenna 44 via radio-frequency transmission line path 42 and front end module 40. Antenna 44 may transmit the radio-frequency signals to external wireless equipment by radiating the radio-frequency signals into free space.

In performing wireless reception, antenna 44 may receive radio-frequency signals from the external wireless equipment. The received radio-frequency signals may be conveyed to transceiver 36 via radio-frequency transmission line path 42 and front end module 40. Transceiver 36 may include circuitry for converting the received radio-frequency signals into corresponding baseband signals. For example, transceiver 36 may include mixer circuitry for down-converting the received radio-frequency signals to baseband frequencies prior to conveying the baseband signals to baseband processor 32 over baseband path 34.

Front end module (FEM) 40 may include radio-frequency front end circuitry that operates on the radio-frequency signals conveyed (transmitted and/or received) over radio-frequency transmission line path 42. FEM 40 may, for example, include front end module (FEM) components such as switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antenna 44 to the impedance of radio-frequency transmission line 42), antenna tuning circuitry (e.g., networks of capacitors, resistors, inductors, and/or switches that adjust the frequency response of antenna 44), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antenna 44. Each of the front end module components may be mounted to a common (shared) substrate such as a rigid printed circuit board substrate or flexible printed circuit substrate.

Transceiver 36 may be separate from FEM 40. For example, transceiver 36 may be formed on another substrate such as the main logic board of device 10, a rigid printed circuit board, or flexible printed circuit that is not a part of FEM 40. While control circuitry 14 is shown separately from wireless circuitry 30 in the example of FIG. 1 for the sake of clarity, wireless circuitry 30 may include processing circuitry that forms a part of processing circuitry 18 and/or storage circuitry that forms a part of storage circuitry 16 of control circuitry 14 (e.g., portions of control circuitry 14 may be implemented on wireless circuitry 30). As an example, baseband processor 32 and/or portions of transceiver 36 (e.g., a host processor on transceiver 36) may form a part of control circuitry 14. Control circuitry 14 (e.g., portions of control circuitry 14 formed on baseband processor 32, portions of control circuitry 14 formed on transceiver 36, and/or portions of control circuitry 14 that are separate from wireless circuitry 30) may provide control signals (e.g., over one or more control paths in device 10) that control the operation of FEM 40.

Transceiver 36 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest. In scenarios where device 10 handles NFC communications bands, device 10 may form an NFC tag (e.g., a passive or active NFC tag having a smart leakage management engine as described herein), may include an NFC tag integrated into a larger device or structure, or may be a different type of device that handles NFC communications, as examples. Communications bands may sometimes be referred to herein as frequency bands or simply as "bands" and may span corresponding ranges of frequencies.

Wireless circuitry 30 may include one or more antennas such as antenna 44. Antenna 44 may be formed using any desired antenna structures. For example, antenna 44 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 44 may be arranged into one or more phased antenna arrays (e.g., for conveying radio-frequency signals at millimeter wave frequencies). Parasitic elements may be included in antenna 44 to adjust antenna performance. Antenna 44 may be provided with a conductive cavity that backs the antenna resonating element of antenna 44 (e.g., antenna 44 may be a cavity-backed antenna such as a cavity-backed slot antenna).

Filter circuitry, switching circuitry, impedance matching circuitry, and other circuitry may be interposed within radio-frequency transmission line path 42, may be incorporated into FEM 40, and/or may be incorporated into antenna 44 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 44 over time.

Device 10 may include power circuitry such as power system 22 (sometimes referred to as power control circuitry). Power system 22 may include a battery such as battery 24. Battery 24 of device 10 may be used to power device 10 when device 10 is not receiving wired or wireless power from another source. In some configurations, device 10 may use battery power associated with an accessory. Power system 22 may also power device 10 using wired or wireless power.

Power system 22 may be used in receiving wired power from an external source (e.g., an external charger, power adapter, or battery case) and/or may include wireless power receiving circuitry for receiving wirelessly transmitted power from a corresponding wireless power transmitting device (e.g., a wireless charging mat or dock). Power management circuitry 26 in power system 22 may be used in managing power consumption and distribution within device 10. For example, power management circuitry 26 may distribute power that has been received by device 10 (e.g., wirelessly or over a wired connection) to internal circuitry in device 10 and/or to battery 24 (e.g., to charge battery 24). Power management circuitry 26 may also be used in producing one or more power supply voltages (e.g., direct-current (DC) power supply voltages) that are used to power the components of device 10. Power management circuitry 26 may, for example, generate the DC power supply voltages from charge stored on battery 24 and/or from power that has been or is being received by device 10 (e.g., wirelessly or over a wired connection).

Power system 22 (e.g., power management circuitry 26 and/or battery 24) may produce any desired number of DC power supply voltages (e.g., positive power supply voltages, ground or reference voltages, etc.). An example in which power system 22 produces a voltage common collector ($V_{CC}$) DC power supply voltage, a voltage drain-drain ($V_{DD}$) DC power supply voltage, and a voltage input-output ($V_{IO}$) DC power supply voltage is sometimes described herein as an example. Power supply voltage $V_{CC}$ may, for example, be a power supply voltage for bipolar junction transistors in device 10. Power supply voltage $V_{DD}$ may, for example, be a power supply voltage for field effect transistors (FETs) in device 10. Power supply voltage $V_{IO}$ may, for example, be a power supply voltage for integrated circuit (IC) input-output (interface) circuitry in device 10 and may sometimes be referred to herein as input-output (IO) power supply voltage $V_{IO}$. In general, power system 22 may produce any other desired power supply voltages for device 10. An example in which power system 22 uses the power supply voltages to power FEM 40 is described herein as an example.

Figure 2:
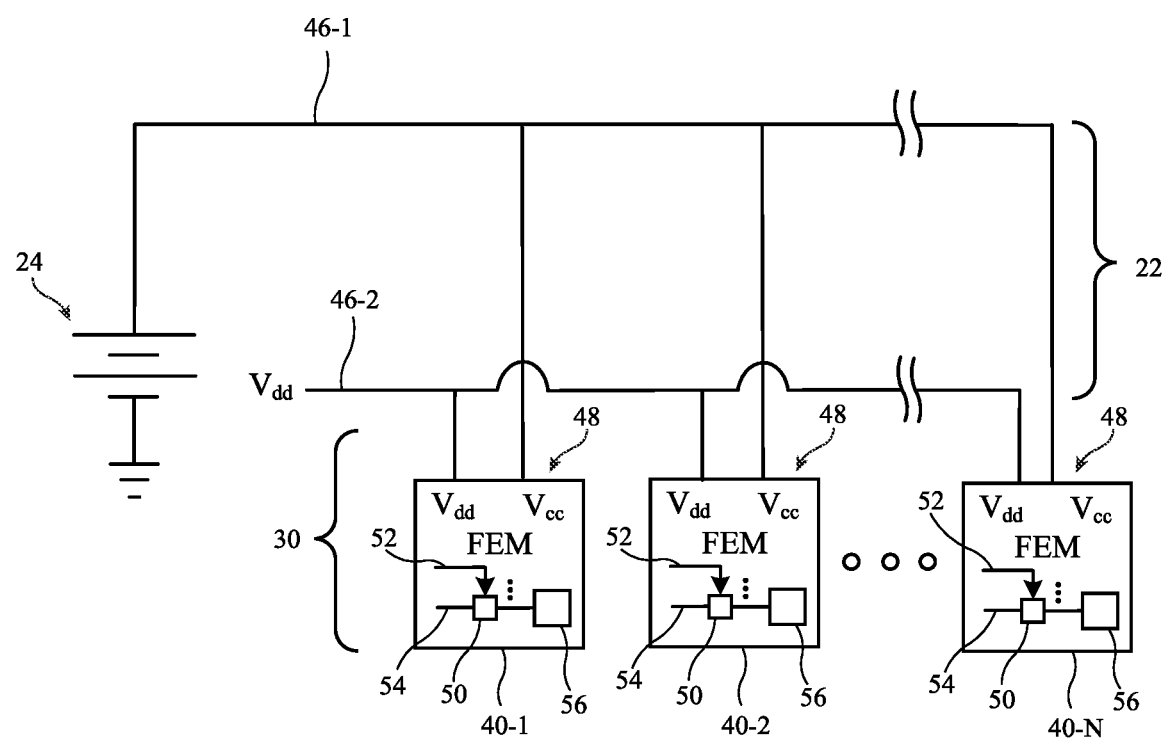
FIG. 2 is a circuit diagram showing how illustrative radio-frequency front end modules may be powered using one or more power supply voltages in accordance with some embodiments.
Figure 3:
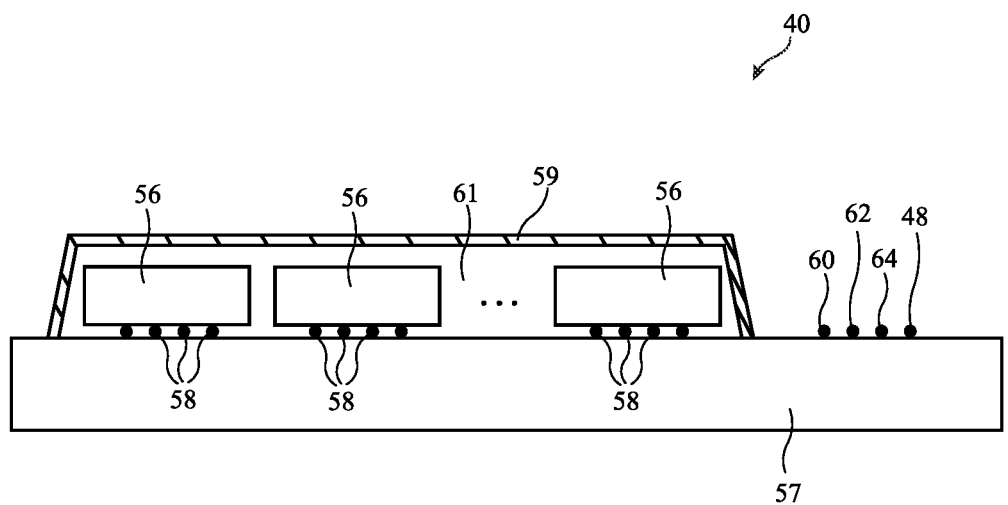
FIG. 3 is a cross-sectional side view of an illustrative radio-frequency front end module in accordance with some embodiments.

FIG. 2 is a circuit diagram showing how power supply voltages $V_{CC}$ and $V_{DD}$ may be provided to the FEMs 40 on device 10. As shown in FIG. 3, wireless circuitry 30 may include N FEMs 40 (e.g., a first FEM 40-1, a second FEM 40-2, an Nth FEM 40-N, etc.). Each FEM 40 may have corresponding power supply input ports 48. Power system 22 may be coupled to the power supply input ports 48 of FEMs 40 via power supply lines 46 external to FEMs 40 (e.g., a first power supply line 46-1, a second power supply line 46-2, etc.). Each power supply line 46 may convey a respective power supply voltage for FEMs 40.

Each FEM 40 may receive power supply voltage $V_{CC}$ over a respective power supply input port 48 (e.g., a $V_{CC}$ power supply input port) that is coupled to power supply line 46-1. Similarly, each FEM 40 may receive power supply voltage $V_{DD}$ over a respective power supply input port 48 (e.g., a $V_{DD}$ power supply input port) that is coupled to power supply line 46-2. Power supply voltages $V_{DD}$ and/or $V_{CC}$ may be produced from charge stored on battery 24. Power management circuitry 26 (FIG. 1) has been omitted from FIG. 2 for the sake of clarity. However, if desired, the power management circuitry (e.g., a supply regulator in the power management circuitry) may be coupled between battery 24 and power supply lines 46. The power management circuitry may produce one or both of power supply voltages $V_{CC}$ and $V_{DD}$ based on the charge stored on battery 24. In one suitable arrangement that is described herein as an example, power supply line 46-1 may receive power supply voltage $V_{CC}$ from battery 24 whereas power supply line 46-2 receives power supply voltage $V_{DD}$ from the power management circuitry. Power supply voltages $V_{CC}$ and $V_{DD}$ may be used to power the FEM components on FEMs 40.

When wireless circuitry 30 is turned on (e.g., when wireless circuitry 30 is actively transmitting and/or receiving radio-frequency signals), all of the power supply voltages produced by power system 22 are generally available and provided to FEMs 40. When wireless circuitry 30 is turned off (e.g., when wireless circuitry 30 is not actively transmitting or receiving radio-frequency signals such as when device 10 is turned off or in a sleep or hibernate operating mode), FEMs 40 continue to draw current from battery 24. For example, power supply voltage $V_{CC}$ is still provided to FEMs 40 whereas power supply voltage $V_{DD}$ and other power supply voltages are not provided to FEMs 40. Continuing to provide power supply voltage $V_{CC}$ even when device 10 is turned off or in the sleep/hibernate operating mode may allow some of the FEM components on FEMs 40 to remain turned on, thereby allowing the FEM components to continue to meet radio-frequency operating requirements (e.g., start-up time requirements, settling time requirements, etc.). In addition, there is inherent silicon leakage that contributes to the continuous current draw by FEMs 40 even when device 10 is turned off or in the sleep/hibernate operating mode. If care is not taken, this continuous current draw can undesirably drain battery 24, can reduce the battery life of battery 24, and/or can lead to reduced shelf life for device 10.

In order to mitigate these effects, in some scenarios, one or more load switches external to FEMs 40 are interposed on power supply line 46-1. Such load switches are not formed as a part of FEMs 40 (e.g., the load switches are external to FEMs 40 and may therefore sometimes be referred to herein as external load switches). The external load switch(es) disconnect battery 24 from FEMs 40 when device 10 is turned off or in the hibernate/sleep operating mode. This may serve to reduce the amount of current drawn by FEMs 40 when device 10 is turned off or in the hibernate/sleep mode, thereby reducing battery drain, increasing battery life, and increasing shelf life for device 10.

In one arrangement, for example, power system 22 may include a single external load switch interposed on power supply line 46-1. In another arrangement, power system 22 may include N external load switches interposed on power supply line 46-1. The state of the external load switches may be controlled by power supply voltage $V_{DD}$, for example. When wireless circuitry 30 is turned on, power supply voltage $V_{DD}$ may be high, which turns on (e.g., closes) the load switch(es) to allow power supply voltage $V_{CC}$ to be provided to FEMs 40. When wireless circuitry 30 is turned off, power supply voltage $V_{DD}$ may be low, which turns off (e.g., opens) the load switch(es) to disconnect FEMs 40 from power supply voltage $V_{CC}$.

The external load switches may serve to reduce the amount of current drawn by FEMs 40 when device 10 is turned off or in the hibernate/sleep mode. However, external load switches consume an excessive amount of area within device 10, can undesirably increase the routing complexity of power system 22 and/or wireless circuitry 30, and can undesirably increase the manufacturing cost of device 10. It would therefore be desirable to be able to provide device 10 with the capability to mitigate leakage current from battery 24 without using external load switches.

In order to mitigate leakage current from battery 24 without using external load switches, each FEM 40 may include a respective leakage current management engine (sometimes referred to herein as a smart leakage management engine). The smart leakage management engine may selectively power off some or all of FEM 40. For example, as shown in FIG. 2, each FEM 40 may include FEM components 56 that are each powered using a corresponding line 54 on FEM 40 (e.g., a power supply line for the FEM component, an enable line for the FEM component, etc.). Switching circuitry such as switch 50 (e.g., a transistor such as a field effect transistor (FET), etc.) may be interposed on line 54. Switch 50 may have a control terminal 52 (e.g., a gate terminal) that receives control signals from the smart leakage management engine. The smart leakage management engine may selectively power off (disable) or power on (enable) each FEM component 56 by controlling the state of a corresponding switch 50 (e.g., by providing control signals to switch 50 at control terminal 52). The smart leakage management engine may power off FEM component 56 by controlling switch 50 (e.g., using control signals at control terminal 52) to form an open circuit on line 54 (e.g., across switch 50) or by controlling switch 50 to form a very high impedance or a very low transconductance $g_m$ through switch 50 (e.g., an impedance that exceeds a threshold impedance value or a transconductance that is less than a threshold transconductance value). In other words, the smart leakage management engine may be referred to herein as "powering off" a given FEM component 56 when the smart leakage management engine controls a corresponding switch 50 on FEM 40 to form an open circuit, a very high impedance, or a very low impedance (e.g., on the power supply line or enable line for that FEM component 56). When switch 50 forms a closed circuit, a low impedance (e.g., an impedance less than a threshold impedance value), or a high transconductance (e.g., a transconductance greater than a threshold transconductance value), the corresponding FEM component 56 may sometimes be referred to herein as being "powered on."

FIG. 3 is a cross-sectional side view of FEM 40. As shown in FIG. 3, FEM 40 may include an FEM substrate such as substrate 57 (sometimes referred to herein as module substrate 57). Substrate 57 may be a rigid printed circuit board, flexible printed circuit, or any other desired module substrate. FEM components 56 (sometimes referred to herein as front end components 56 or components 56) may be mounted to one or more surfaces of substrate 57. In the example of FIG. 3, each FEM component 56 in FEM 40 is mounted to the same surface of FEM 40. This is merely illustrative and, if desired, one or more FEM components 56 may be mounted to the opposing surface of substrate 57.

FEM components 56 may include, for example, switching circuitry, radio-frequency filter circuitry, impedance matching circuitry, antenna tuning circuitry, radio-frequency amplifier circuitry, radio-frequency coupler circuitry, charge pump circuitry, power management circuitry, digital control and interface circuitry, a leakage management engine (e.g., a leakage current management engine formed as a part of digital control and interface circuitry), and/or any other desired circuitry for performing operations on the radio-frequency signals transmitted and/or received by antenna 44 (FIG. 1). If desired, one or more (e.g., each) of FEM components 56 may include circuitry formed on a respective integrated circuit (IC) die (chip). FEM components 56 may be coupled to conductive traces (e.g., contact pads) on substrate 57 via conductive interconnect structures 58 (e.g., solder balls, a ball grid array (BGA), conductive adhesive, welds, conductive springs, conductive pins, etc.). FEM 40 may be a multi-chip package having multiple different IC dies mounted to the same substrate 57, may be manufactured as a monolithic die (e.g., using complementary metal-oxide semiconductor (CMOS), silicon-germanium (SiGe), or other IC processes) and packaged in any desired number of IC packages suitable for printed circuit board (PCB) mounting (e.g., using a BGA technology, quad-flat no-leads (QFN) technology, dual-flat no-leads (DFN) technology, etc.), may be formed using a single IC or chip, etc.

If desired, one or more (e.g., all) of FEM components 56 may be embedded within an overmold structure such as overmold 61 (e.g., a plastic overmold). One or more electromagnetic shielding components such as shield 59 (e.g., a conductive or ferrite shielding structure) may be provided over one or more (e.g., all) of FEM components 56. Multiple different shields may be provided over different subsets of the FEM components 56 in FEM 40 if desired.

FEM 40 may also include input-output (IO) ports on substrate 57. For example, as shown in FIG. 3, FEM 40 may include power supply input ports 48, one or more serial communications ports 60, one or more control ports 62, and/or one or more radio-frequency (RF) ports 64. Ports 60, 62, 64, and 48 may include conductive contact pads, conductive traces, solder balls, welds, conductive springs, conductive adhesive, conductive pins, and/or any other desired conductive interconnect structures on one or more surfaces of substrate 57. Ports 60, 62, 64, and 48 need not be on the same surface of substrate 57 as FEM components 56.

Figure 4:
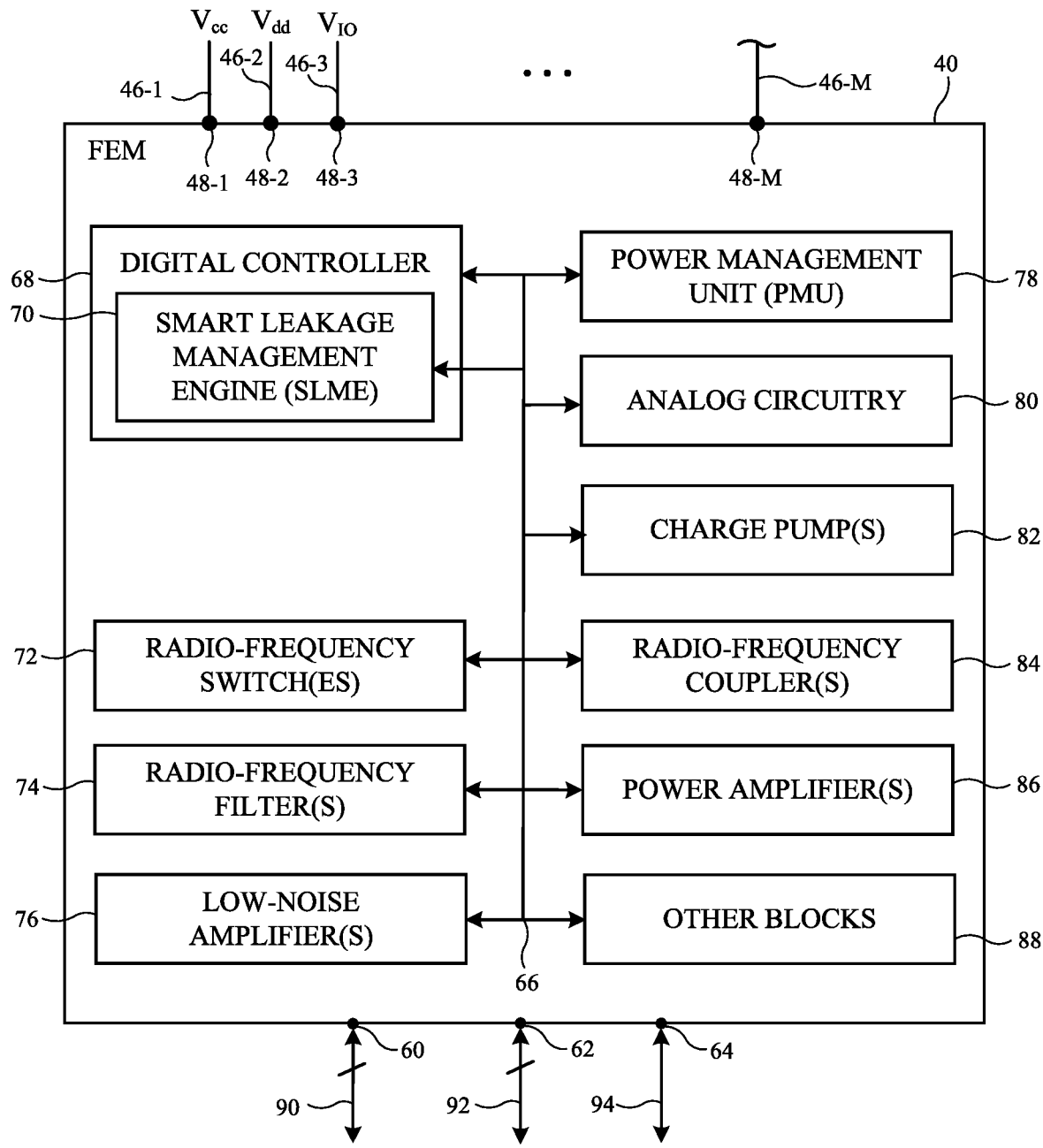
FIG. 4 is a block diagram of an illustrative radio-frequency front end module having a smart leakage management engine in accordance with some embodiments.

FIG. 4 is a diagram showing how the FEMs in wireless circuitry 30 may include leakage current management engines for mitigating leakage current from battery 24 (e.g., without the use of external load switches). The FEM 40 shown in FIG. 4 may be used to form one, more than one, or all of the N FEMs 40 in wireless circuitry 30.

As shown in FIG. 4, FEM 40 may include M power supply input ports 48 (e.g., a first power supply input port 48-1, a second power supply input port 48-2, an Mth power supply input port 48-M). Each power supply input port 48 may be coupled to a respective one of M power supply lines 46 (e.g., a first power supply line 46-1 coupled to power supply input port 48-1, a second power supply line 46-2 coupled to power supply input port 48-2, an Mth power supply line 46-M coupled to power supply input port 48-M, etc.). Each power supply line 46 may convey a respective power supply voltage from power management circuitry 26 and/or battery 24 (FIG. 1). In the example of FIG. 4, FEM 40 receives power supply voltage $V_{CC}$ over power supply line 46-1 and power supply input port 48-1, receives power supply voltage $V_{DD}$ over power supply line 46-2 and power supply input port 48-2, and receives IO power supply voltage $V_{IO}$ over power supply line 46-3. FEM 40 may receive additional power supply voltages over additional power supply lines 46 and power supply input ports 48 if desired.

FEM 40 may include FEM components (e.g., FEM components 56 of FIG. 3). The FEM components 56 on FEM 40 may include, for example, digital control circuitry such as digital controller 68, power management circuitry such as power management unit (PMU) 78, analog circuitry 80, charge pump circuitry such as one or more charge pumps 82, radio-frequency switching circuitry such as one or more radio-frequency switches 72, radio-frequency coupler circuitry such as one or more radio-frequency couplers 84, radio-frequency filter circuitry such as one or more radio-frequency filters 74, power amplifier (PA) circuitry such as one or more power amplifiers 86, low-noise amplifier (LNA) circuitry such as one or more low-noise amplifiers 76, and other blocks 88. Each of these components may be formed on respective integrated circuit chips (e.g., each of these components may form a respective one of the FEM components 56 shown in FIG. 3), two or more of these components may be formed on the same integrated circuit chip (e.g., two or more of these components may be formed on the same FEM component 56 shown in FIG. 3), and/or one or more of these components may be distributed across multiple integrated circuit chips (e.g., one or more of these components may be formed on different ones of the FEM components 56 shown in FIG. 3) mounted to the substrate 57 (FIG. 3). One or more of these components may be formed from circuitry that is not a part of an integrated circuit (e.g., one or more of these components may include surface mount technology (SMT) components mounted to substrate 57, components embedded within substrate 57, conductive traces on or within substrate 57, and/or other circuitry mounted to or within substrate 57). In one suitable arrangement that is described herein as an example, at least digital controller 68 may be formed from a dedicated integrated circuit (e.g., a given one of the FEM components 56 shown in FIG. 3 may be a controller integrated circuit that includes digital controller 68) whereas the other components on FEM 40 are formed on other integrated circuits and/or on substrate 57 (e.g., external to the controller integrated circuit).

As shown in FIG. 4, each of the FEM components on FEM 40 may be coupled to signal paths 66. Signal paths 66 (sometimes referred to herein as intra-FEM signal paths) may include a communications bus, data paths, control signal paths, power supply lines, radio-frequency transmission lines, and/or any other desired paths for conveying signals and/or power between the FEM components on FEM 40 and/or external components via the input-output ports of FEM 40. In addition to power supply input ports 48, FEM 40 may include additional input-output ports such as one or more serial communications ports 60, one or more control ports 62, and/or one or more radio-frequency (RF) ports 64.

Serial communications ports 60 may be coupled to one or more serial interface paths 90. Serial communications ports 60 and serial interface paths 90 may form serial interfaces such as a Mobile Industry Processor Interface RF Front End (MIPI RFFE) interfaces, Universal Asynchronous Receiver-Transmitter (UART) interfaces, System Power Management Interfaces (SPMI), or Inter-Integrated-Circuit (I2C) interfaces, as examples. Control ports 62 may be, for example, input-output communications ports such as General Purpose Input-Output (GPIO) communications ports. Control ports 62 may be coupled to one or more IO paths 92.

RF ports 64 may be coupled to one or more radio-frequency signal paths 94. Radio-frequency signal paths 94 may, for example, include one or more transmission lines in radio-frequency transmission line path 42 of FIG. 1. As an example, RF ports 64 may include a first RF port coupled to transceiver 36 over a first transmission line in radio-frequency transmission line path 42 and a second RF port coupled to antenna 44 over a second transmission line in radio-frequency transmission line path 42. The first RF port may receive radio-frequency signals from transceiver 36 for transmission by antenna 44. The second RF port may be used to transmit these radio-frequency signals to antenna 44. In addition, the second RF port may receive radio-frequency signals that were received by antenna 44. The first RF port may transmit these radio-frequency signals to transceiver 36. One or more of the FEM components on FEM 40 may operate on these radio-frequency signals prior to transmission by antenna 44 and/or after reception by antenna 44. This example is merely illustrative. RF ports 64 may include any desired number of RF ports for coupling FEM 40 to any desired number of transceivers and antennas.

FEM 40 may receive control signals from a host processor. The host processor may include control circuitry on transceiver 36 (FIG. 1), control circuitry on baseband processor 32, and/or control circuitry 14 (e.g., an applications processor running on control circuitry 14). FEM 40 may receive the control signals from the host processor via control ports 62 and/or serial communications ports 60 (e.g., the control signals may be received via a GPIO port, an MIPI RFFE interface, a UART interface, an SPMI interface, and/or an I$^2$C interface of FEM 40). The control signals (e.g., control commands or instructions conveyed by the control signals) may control the operation of one or more of the FEM components on FEM 40 (e.g., in operating on the radio-frequency signals conveyed over RF ports 64). The control commands received by FEM 40 may control digital controller 68 and FEM 40 to perform, as examples, scheduled events, direct power savings operations (e.g., the control commands may include direct power savings commands), thermal management operations, etc. If desired, FEM 40 may also transmit control signals to the host processor via ports 62 and/or 60. These control signals may be used to report the current operating mode of FEM 40 and/or the state of one or more of the FEM components on FEM 40 to the host processor, for example. In other words, serial communications ports 60 and/or control ports 62 may form part of a bi-directional interface between FEM 40 and the host processor.

PMU 78 on FEM 40 may include circuitry for managing the distribution of power (e.g., one or more of the power supply voltages received via power supply input ports 48) to other FEM components on FEM 40. One or more of the FEM components may, if desired, be powered by power supply voltages received from PMU 78 (e.g., via power supply lines in signal paths 66). If desired, PMU 78 may be formed from a dedicated power management integrated circuit in FEM 40. PMU 78 may include, for example, regulator circuitry such as a low-dropout (LDO) regulator that provides one or more power supply voltages to other FEM components on FEM 40. Charge pumps 82 may perform DC-to-DC conversion (e.g., using capacitors and/or other charge storage elements) for FEM 40 (e.g., on one or more of the power supply voltages for FEM 40).

FEM components on FEM 40 such as radio-frequency switches 72, radio-frequency filters 74, low-noise amplifiers 76, power amplifiers 86, and radio-frequency couplers 84 may operate (e.g., in the radio-frequency domain) on the radio-frequency signals received by FEM 40. Radio-frequency filters 74 may include, for example, low pass filters, high pass filters, bandpass filters, notch filters, diplexer circuitry, duplexer circuitry, triplexer circuitry, and/or any other desired filters that filter the radio-frequency signals. Radio-frequency switches 72 may be used to route the radio-frequency signals within FEM 40 and/or between different transceivers 36 and/or antennas 44 (FIG. 1). Radio-frequency couplers 84 may be used to measure transmitted, received, and/or reflected radio-frequency signals (e.g., for gathering impedance measurements such as radio-frequency scattering parameter information from the antennas) and/or may be used to route portions of the radio-frequency signals conveyed over RF ports 64 outside of the transmit/receive path of wireless circuitry 30. Power amplifiers 86 may be used to amplify the radio-frequency signals that are to be transmitted over antenna 44. Low-noise amplifiers 76 may be used to amplify the radio-frequency signals that are received by antenna 44.

FEM 40 may include analog circuitry 80 that includes, for example, sensing circuitry (e.g., temperature sensing circuitry, voltage sensing circuitry, current sensing circuitry, etc.), impedance matching circuitry, antenna tuning circuitry (e.g., networks of capacitors, resistors, and/or inductors), biasing circuitry, and/or any other desired analog circuitry for FEM 40. The example of FIG. 4 is merely illustrative and, in general, FEM 40 may include any desired FEM components that operate on or that support operation on the radio-frequency signals conveyed over RF ports 64 (see, e.g., other blocks 88).

Digital controller 68 may include digital control and interface circuitry for FEM 40. Digital controller 68 may include control circuitry (e.g., digital logic) that controls the operation of the FEM components on FEM 40. Digital controller 68 may, for example, receive control commands from the host processor (sometimes referred to herein as host commands) that instruct digital controller 68 to turn different FEM components on or off and/or that instruct digital controller 68 to otherwise adjust the operation of the FEM components over time. Digital controller 68 may control the FEM components by providing control signals to the FEM components over signal paths 66.

FEM 40 may include leakage management circuitry that mitigates leakage current from battery 24 without the use of external load switches. For example, as shown in FIG. 4, FEM 40 may include a leakage management engine such as leakage management engine 70 (sometimes referred to herein as smart leakage management engine (SLME) 70). In one suitable arrangement that is described herein as an example, SLME 70 may be integrated within digital controller 68 (e.g., SLME 70 may be on the controller integrated circuit used to form digital controller 68). SLME 70 may, for example, be formed from hardware logic on digital controller 68 (e.g., digital logic gates, one or more programmable logic devices (PLDs), one or more state machines, etc.). The hardware logic in SLME 70 may be arranged and controlled in a manner that configures the SLME 70 to perform the leakage management operations described herein. The example of FIG. 4 is merely illustrative and, in general, SLME 70 may be formed at any desired location on FEM 40.

SLME 70 may monitor/track the operating mode of FEM 40, control commands received over ports 60 and/or 62, the operating state of one or more (e.g., all) of the FEM components on FEM 40 (e.g., via signal paths 66), and/or one or more (e.g., all) of the power supply voltages received by FEM 40. SLME 70 may selectively disable (power off) different FEM components on FEM 40 based on the current operating mode of FEM 40, the control commands received over ports 60 and/or 62, the operating state of one or more of the FEM components on FEM 40, one or more of the power supply voltages received by FEM 40, and/or the next possible operating mode of FEM 40. SLME 70 may selectively disable (power off) and may selectively enable (power on) the FEM components by providing corresponding control signals to the FEM components and/or to switching circuitry on FEM 40 (e.g., switches 50 of FIG. 2) over signal paths 66. As an example, SLME 70 may disable one or more of the FEM components by disconnecting (decoupling) power supply voltage $V_{CC}$ from those FEM components or otherwise disabling sources of leakage current based on the current state of one or more of the other power supply voltages received by FEM 40 (e.g., when power supply voltage $V_{DD}$ is received at a logic low level or is otherwise unavailable to FEM 40).

If desired, one or more of the FEM components on FEM 40 may remain enabled (powered on) while other FEM components are powered off (unlike in scenarios in which external load switches are used, where all of the FEM components in the FEM are turned off at once). Disabling FEM components (e.g., when power supply voltage $V_{DD}$ is low) may reduce the overall leakage current produced by FEM 40 when not actively transmitting or receiving radio-frequency signals. This may serve to reduce battery drain, increase battery life, and/or increase shelf life for device 10 without the space consumption or cost associated with external load switches.

Figure 5:
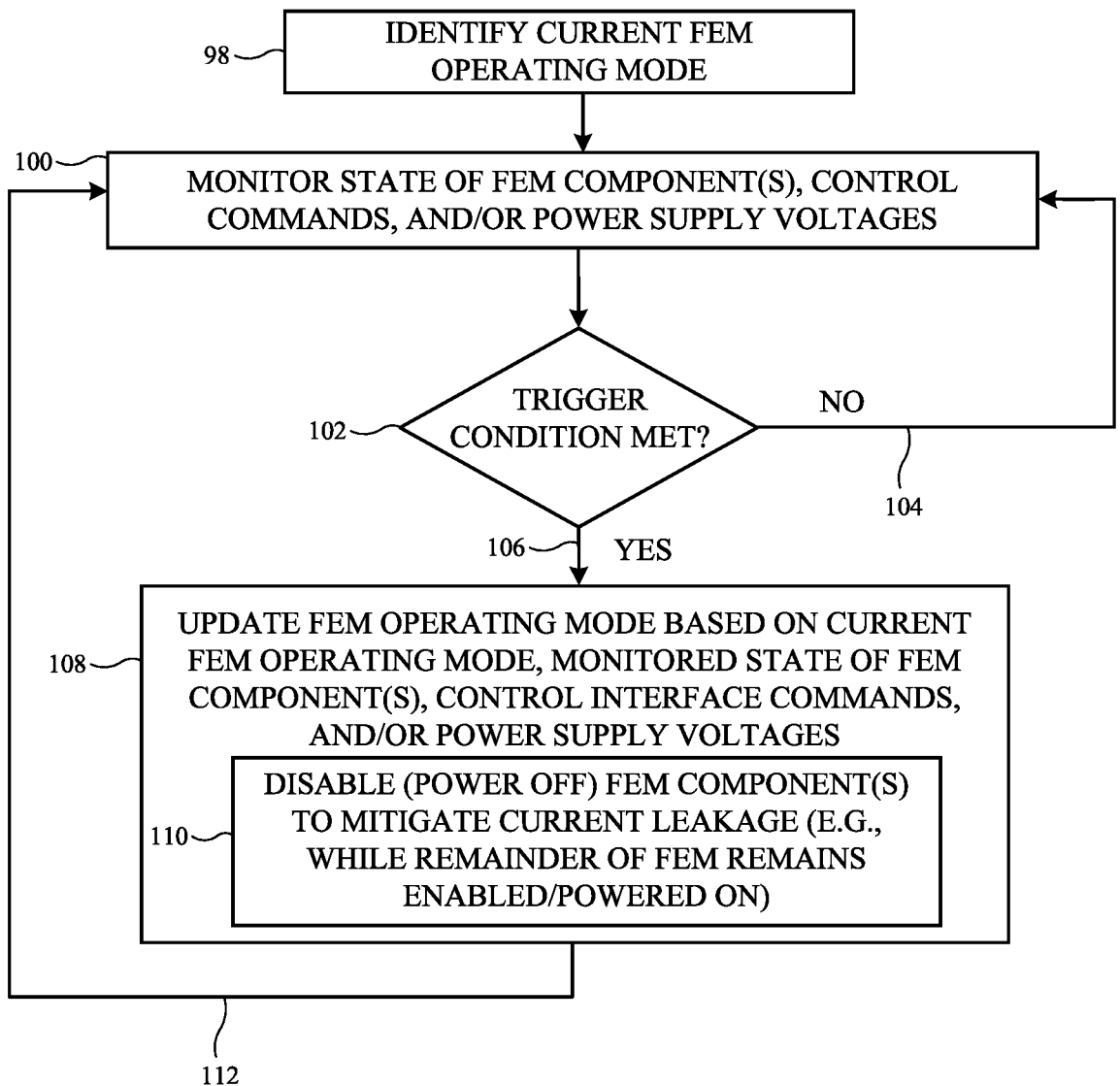
FIG. 5 is a flow chart of illustrative steps involved in operating a smart leakage management engine to mitigate current leakage in a radio-frequency front end module in accordance with some embodiments.

FIG. 5 is a flow chart of illustrative steps that may be performed by SLME 70 in controlling FEM 40 to mitigate leakage current. SLME 70 and FEM 40 may be operable in a number of different operating modes (sometimes referred to herein as operating states, FEM operating states, or FEM operating modes). For example, SLME 70 and FEM 40 may be operable in at least a full power mode, an autonomous mode, a zero leakage mode, and a low power mode. SLME 70 and FEM 40 may transition between different operating modes when certain trigger conditions are met. Different sets of FEM components on FEM 40 may be active (powered on) or inactive (powered off) in each of the operating modes. Each operating mode may also have different power supply needs.

At step 98, SLME 70 may identify the current operating mode of FEM 40 (e.g., by querying other logic at digital controller 68). Digital controller 68 and SLME 70 may track the current operating mode of FEM 40 over time.

At step 100, SLME 70 may monitor the state of one or more of the FEM components on FEM 40 (e.g., SLME 70 may have a priori knowledge of the state of each of the FEM components and/or may receive signals over signal paths 66 of FIG. 4 that identify the states of the FEM components), may monitor control commands received by FEM 40 from the host processor over control ports 62 and/or serial communications ports 60, and/or may monitor one or more of the power supply voltages received at power supply input ports 48. SLME 70 may, for example, include voltage sensing hardware logic (circuitry) that senses (identifies) the voltage level of one or more of the power supply voltages received at power supply input ports 48.

At step 102, SLME 70 may determine whether a trigger condition is met based on the monitored state of the FEM components on FEM 40, the control commands received by FEM 40, and/or the power supply voltage(s) received at power supply input ports 48. In one suitable arrangement that is sometimes described herein as an example, the trigger condition may vary depending on the current operating mode of SLME 70 and FEM 40 (e.g., different trigger conditions may be applied based on the current operating mode as identified while processing step 98). The trigger condition may, for example, be a change in one or more of the received power supply voltages (e.g., power supply voltage $V_{DD}$ or IO power supply voltage $V_{IO}$) from a logic high level to a logic low level or from a logic low level to a logic high level. As another example, the trigger condition may be receipt of a control command from the host processor that instructs digital controller 68 to change the operating mode of FEM 40.

If a trigger condition is not met, processing may loop back to step 100, as shown by arrow 104. SLME 70 may continue to monitor the conditions of FEM 40 in the current operating mode until a trigger condition is met. If a trigger condition is met, processing may proceed to step 108 as shown by arrow 106.

At step 108, SLME 70 may update the current operating mode based on the current operating mode, the monitored state of the FEM components on FEM 40, the control commands received by FEM 40, and/or the power supply voltage(s) received at power supply input ports 48. In updating the current operating mode, SLME 70 may selectively disable (power off) or enable (power on) one or more of the FEM components on FEM 40 (step 110). As an example, SLME 70 may include switching circuitry that is used to selectively power off or power on different FEM components (e.g., switches 50 of FIG. 2 may be formed on SLME 70 if desired). Additionally or alternatively, SLME 70 may provide control signals to switching circuitry on the FEM components and/or to switching circuitry on power supply or enable lines for the FEM components (see, e.g., switches 50 on lines 54 of FIG. 2) that selectively power those FEM components on or off. If desired, the remainder of FEM 40 (e.g., at least some of the FEM components on FEM 40) may remain powered on while the set of FEM components powered off by SLME 70 remain disabled. Processing may then loop back to step 100, as shown by arrow 112, and SLME 70 may continue to monitor the conditions of FEM 40 in the current operating mode until a trigger condition is met.

Figure 6:
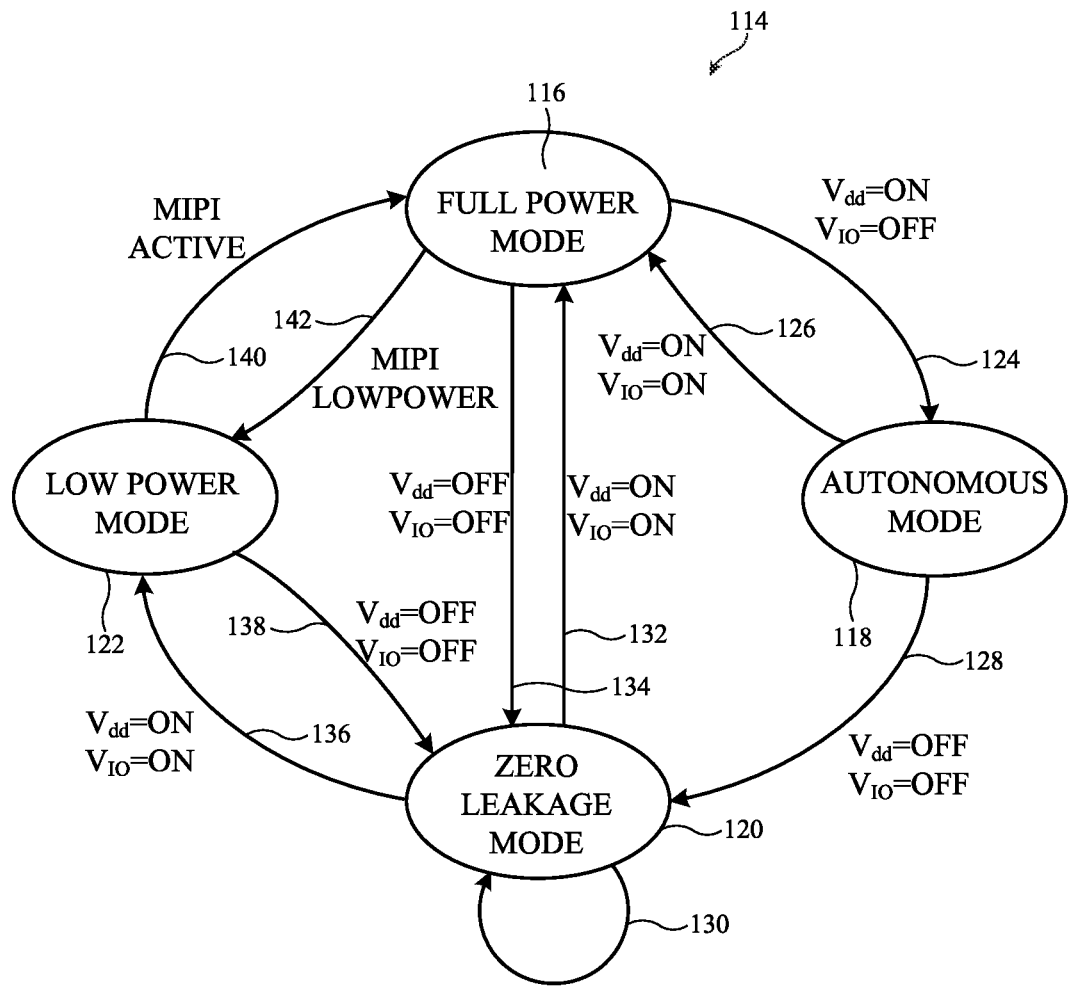
FIG. 6 is a state diagram showing illustrative operating modes for a smart leakage management engine in accordance with some embodiments.

FIG. 6 shows a state diagram 114 of illustrative operating modes (states) for SLME 70 and FEM 40. As shown in FIG. 6, SLME 70 and FEM 40 may have at least four operating modes such as full power mode 116, autonomous mode 118, zero leakage mode 120, and low power mode 122.

In full power mode 116, each of the power supply voltages received at power supply input ports 48 (FIG. 4) may be available to the FEM components on FEM 40 (e.g., at least power supply voltages $V_{DD}$, $V_{IO}$, and $V_{CC}$ may be received by FEM 40 at a logic high level, sometimes referred to herein as the voltages being "ON"). Wireless circuitry 30 may actively transmit and/or receive radio-frequency signals using antenna 44 in full power mode 116. Each of the FEM components on FEM 40 may be active (sometimes referred to herein as being enabled, powered on, or turned on) while in full power mode 116. The FEM components may operate on the radio-frequency signals transmitted and/or received by antenna 44 (e.g., radio-frequency filters 74 of FIG. 4 may filter the radio-frequency signals, radio-frequency switches 72 may route the radio-frequency signals within FEM 40, low-noise amplifiers 76 may amplify received radio-frequency signals, power amplifiers 86 may amplify transmitted radio-frequency signals, radio-frequency couplers 84 may be used to gather impedance measurements, charge pumps 82 may perform DC-to-DC conversion, PMU 78 may power the components of FEM 40, etc.).

SLME 70 may monitor the state of the FEM components on FEM 40, control commands received by FEM 40 over control ports 62 and/or serial communications ports 60, and/or the power supply voltage(s) received at power supply input ports 48 (e.g., while processing step 100 of FIG. 5). While in full power mode 116, if SLME 70 detects that IO power supply voltage $V_{IO}$ has changed to a logic low level or is otherwise unavailable (sometimes referred to herein as the voltage being "OFF") while power supply voltage $V_{DD}$ remains ON, SLME 70 may place FEM 40 in autonomous mode 118, as shown by arrow 124 (e.g., while processing step 108 of FIG. 5). In this example, the change in IO power supply voltage $V_{IO}$ from ON to OFF (e.g., from logic high to logic low) may serve as the trigger condition for the transition from full power mode 116 to autonomous mode 118 (e.g., as processed at step 102 of FIG. 5).

In autonomous mode 118 (sometimes referred to herein as a standalone mode for device 10), wireless circuitry 30 may actively transmit and/or receive radio-frequency signals using antenna 44. If desired, a first set of one or more of the FEM components on FEM 40 may be powered off (sometimes referred to herein as being inactive, disabled, or turned off) in autonomous mode 118. SLME 70 may power off these FEM components by providing control signals to switching circuitry on SLME 70, by providing control signals to switching circuitry on power supply or enable lines for the FEM components, and/or by providing control signals to switching circuitry within the FEM components (e.g., switches 50 of FIG. 2 may be located in SLME 70, on signal paths 66, and/or within the FEM components). At the same time, at least some of the FEM components on FEM 40 may remain powered on in autonomous mode 118. Disabling at least some of the FEM components may serve to minimize leakage current in FEM 40 while FEM 40 continues to support the transmission and/or reception of radio-frequency signals.

While in autonomous mode 118, if SLME 70 detects that IO power supply voltage $V_{IO}$ has changed from OFF to ON while power supply voltage $V_{DD}$ remains ON, SLME 70 may place FEM 40 in full power mode 116, as shown by arrow 126 (e.g., the change in IO power supply voltage $V_{IO}$ from OFF to ON may serve as the trigger condition for the transition from autonomous mode 118 to full power mode 116). However, if SLME 70 detects that power supply voltage $V_{DD}$ has changed from ON to OFF while IO power supply voltage $V_{IO}$ remains OFF, SLME 70 may place FEM 40 in zero leakage mode 120, as shown by arrow 128 (e.g., the change in power supply voltage $V_{DD}$ from ON to OFF may serve as the trigger condition for the transition from autonomous mode 118 to zero leakage mode 120).

In zero leakage mode 120 (sometimes referred to herein as a power off mode for device 10), wireless circuitry 30 does not actively transmit or receive radio-frequency signals. If desired, a second set of one, more than one, or all of the FEM components on FEM 40 may be powered off in zero leakage mode 120. The second set may include more FEM components than the first set of FEM components disabled in autonomous mode 118, as an example. If desired, at the same time, one or more of the FEM components on FEM 40 may remain powered on in zero leakage mode 120.

FEM 40 may continue to receive power supply voltage $V_{CC}$ (e.g., power supply voltage $V_{CC}$ may be ON) in zero leakage mode 120. Disabling the second set of FEM components may serve to minimize leakage current associated with power supply voltage $V_{CC}$ and/or the other power supply voltages produced by power system 22 (FIG. 1) while FEM 40 is not being used to transmit or receive radio-frequency signals. If desired, while in zero leakage mode 120, SLME 70 may place FEM 40 in a cut-off operating mode when power supply voltage $V_{CC}$ has changed to OFF and may return to zero leakage mode 120 when power supply voltage $V_{CC}$ has changed back to ON, as shown by arrow 130. SLME 70 may power off a third set of FEM components in the cut-off operating mode, if desired.

While in zero leakage mode 120, if SLME 70 detects that both IO power supply voltage $V_{IO}$ and power supply voltage $V_{DD}$ have changed from OFF to ON, SLME 70 may place FEM 40 in full power mode 116, as shown by arrow 132, or may place FEM 40 in low power mode 122, as shown by arrow 136 (e.g., the change in IO power supply voltage $V_{IO}$ and power supply voltage $V_{DD}$ from OFF to ON may serve as the trigger condition for the transition from zero leakage mode 120 to full power mode 116 or low power mode 122). If desired, SLME 70 may transition FEM 40 from zero leakage mode 120 to low power mode 122 (rather than to full power mode 116) when SLME 70 receives a control command from the host processor instructing digital controller 68 to place FEM 40 in low power mode 122 (e.g., in addition to or instead of when SLME 70 detects that IO power supply voltage $V_{IO}$ and power supply voltage $V_{DD}$ have changed from OFF to ON). While in full power mode 116, if SLME 70 detects that both IO power supply voltage $V_{IO}$ and power supply voltage $V_{DD}$ have changed from ON to OFF, SLME 70 may place FEM 40 in zero leakage mode 120, as shown by arrow 134 (e.g., the change in IO power supply voltage $V_{IO}$ and power supply voltage $V_{DD}$ from ON to OFF may serve as the trigger condition for the transition from full power mode 116 to zero leakage mode 120).

In low power mode 122 (sometimes referred to herein as a sleep or hibernate mode for device 10), wireless circuitry 30 may periodically transmit and/or receive radio-frequency signals (e.g., with less total power or less frequently than when FEM 40 is in full power mode 116 or autonomous mode 118). If desired, a fourth set of one or more of the FEM components on FEM 40 may be powered off in low power mode 122. The fourth set may include more, less, or the same number of FEM components as the first set of FEM components disabled in autonomous mode 118. If desired, the FEM components in the fourth set may be different from the FEM components in the first set. At the same time, at least some of the FEM components on FEM 40 may remain powered on in low power mode 122.

While in low power mode 122, if SLME 70 detects that a control command such as an MIPI ACTIVE command has been received from the host processor (e.g., over serial communications ports 60 of FIG. 4), SLME 70 may place FEM 40 in full power mode 116, as shown by arrow 140 (e.g., the receipt of the MIPI ACTIVE command may serve as the trigger condition for the transition from low power mode 122 to full power mode 116). This example is merely illustrative and, in general, the trigger condition may be receipt of any desired control command from the host processor instructing digital controller 68 to transition to full power mode 116.

While in full power mode 116, if SLME 70 detects that a control command such as an MIPI LOWPOWER command has been received from the host processor, SLME 70 may place FEM 40 in low power mode 122, as shown by arrow 142 (e.g., the receipt of the MIPI LOWPOWER command may serve as the trigger condition for the transition from full power mode 116 to low power mode 122). This example is merely illustrative and, in general, the trigger condition may be receipt of any desired control command from the host processor instructing digital controller 68 to transition to low power mode 122. While in low power mode 122, if SLME 70 detects that both IO power supply voltage $V_{IO}$ and power supply voltage $V_{DD}$ have changed from ON to OFF, SLME 70 may place FEM 40 in zero leakage mode 120, as shown by arrow 138 (e.g., the change in IO power supply voltage $V_{IO}$ and power supply voltage $V_{DD}$ from ON to OFF may serve as the trigger condition for the transition from low power mode 122 to zero leakage mode 120).

The example of FIG. 6 is merely illustrative. If desired, there may be direct transitions from low power mode 122 to autonomous mode 118, from autonomous mode 118 to low power mode 122, and/or from zero leakage mode 120 to autonomous mode 118. SLME 70 may use any desired trigger conditions for transitioning between operating modes. If desired, receipt of a control command from the host processor (e.g., via control port 62 and/or serial communications port 60) may serve as the trigger condition for any of the transitions in state diagram 114 (e.g., receipt of a control command from the host processor may, if desired, override a transition that would otherwise be performed based on a change in the state of one or more of the power supply voltages). SLME 70 may use changes in any desired power supply voltages in determining when to transition between operating states. FEM 40 and SLME 70 may include any desired number of operating states and any desired transitions between the operating states. In general, zero, one, or more than one FEM component may be disabled by SLME 70 in each of the operating states to mitigate leakage current in FEM 40.

Figure 7:
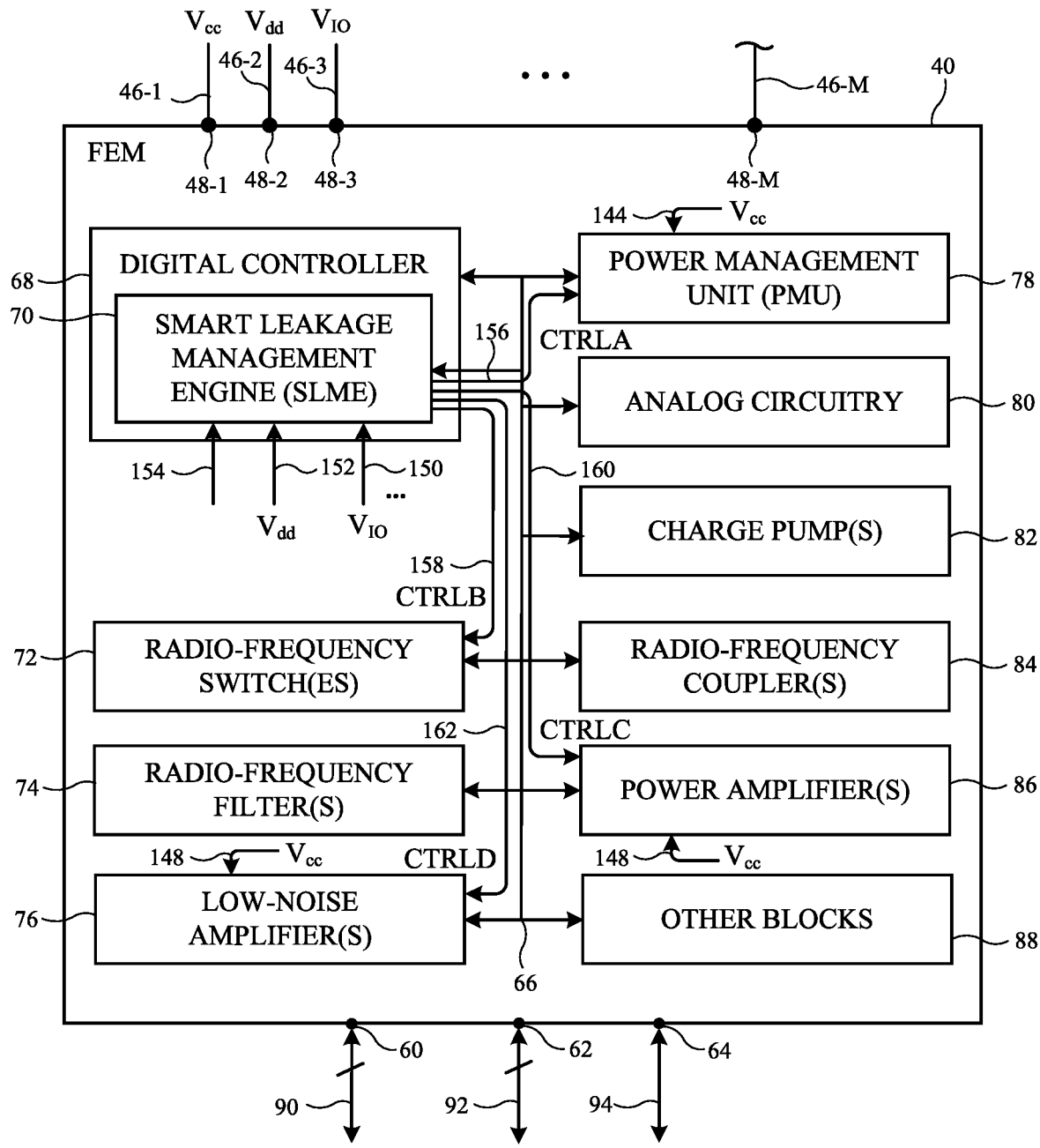
FIG. 7 is a diagram showing how an illustrative smart leakage management engine may use control signals to disable different radio-frequency front end module components to mitigate current leakage in accordance with some embodiments.

FIG. 7 is a diagram showing one example of how SLME 70 may use control signals to disable FEM components on FEM 40. As shown in FIG. 7, SLME 70 may receive power supply voltage $V_{DD}$ at power supply input 152, may receive IO power supply voltage $V_{IO}$ at power supply input 150, and may receive control commands from the host processor at control input 154. Control input 154 may, for example, be coupled to control ports 62 and/or serial communications ports 60 (e.g., over signal paths 66). Power supply input 152 may, for example, be coupled to power supply input port 48-2 (e.g., over signal paths 66). Power supply input 150 may, for example, be coupled to power supply input port 48-3 (e.g., over signal paths 66). SLME 70 may process the control commands received over control input 154, power supply voltage $V_{DD}$ received over power supply input 152, and/or IO power supply voltage $V_{IO}$ received over power supply input 150 to determine when and how to change the operating state of FEM 40.

Consider an example in which FEM 40 is in full power mode 116 (FIG. 6) and SLME 70 determines that FEM 40 is to be placed in a different operating mode in which some of the FEM components are disabled to mitigate leakage current. In this scenario, SLME 70 may provide control signals to the FEM components that are to be disabled via signal paths 66. As an example, SLME 70 may provide control signal CTRLA to PMU 78 to disable PMU 78 (as shown by arrow 156), may provide control signal CTRLB to radio-frequency switches 72 to power off radio-frequency switches 72 (as shown by arrow 158), may provide control signal CTRLC to power amplifiers 86 to turn off power amplifiers 86 (as shown by arrow 160), may provide control signal CTRLD to low-noise amplifiers 76 to turn off low-noise amplifiers 76 (as shown by arrow 162), etc.

If desired, one or more of the FEM components may have enable lines with switches (e.g., transistors) that are controlled by the control signals from SLME 70 (e.g., switches 50 of FIG. 2). The enable lines may, for example, control whether the corresponding FEM component receives a given power supply voltage (e.g., power supply voltage $V_{CC}$). The control signals (e.g., control signal CTRLA, control signal CTRLB, control signal CTRLC, control signal CTRLD, etc.) may selectively enable (power on) or disable (power off) the FEM components by providing control signals to the control terminals of the switches (e.g., control terminals 52 of FIG. 2). For FEM components that do not have a corresponding enable line and switch, additional enable lines and switches may be added to signal paths 66 to allow SLME 70 to selectively enable or disable the FEM components.

If desired, SLME 70 may selectively power off FEM components by providing control signals to PMU 78 (e.g., without providing control signals directly to the FEM components to be powered off). PMU 78 may provide power supply voltages that power other FEM components on FEM 40 (e.g., based on a power supply voltage such as power supply voltage $V_{CC}$ received by PMU 78 via power supply input 144). As an example, power amplifiers 86 may be powered by power supply voltage $V_{CC}$ as received from PMU 78 via power supply input 146. In this example, SLME 70 may control PMU 78 to selectively power on or power off power amplifiers 86 using the control signals CTRLA that are provided to PMU 78. Similarly, low-noise amplifiers 76 may be powered by power supply voltage $V_{CC}$ as received from PMU 78 via power supply input 148. In this example, SLME 70 may control PMU 78 to selectively power on or power off low-noise amplifiers 76 using the control signals CTRLA that are provided to PMU 78. Other FEM components may be disabled in this way if desired.

Figure 8:
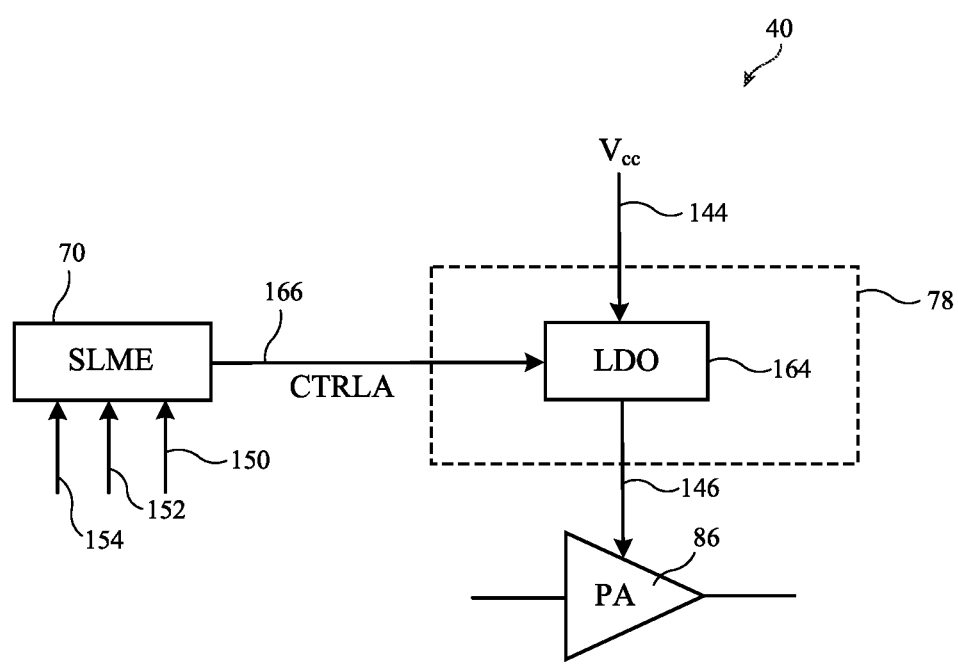
FIG. 8 is a diagram showing how an illustrative smart leakage management engine may control a power management unit to disable other front end module components in accordance with some embodiments.

FIG. 8 is a diagram showing one example of how SLME 70 may control PMU 78 to selectively enable or disable a given power amplifier 86. As shown in FIG. 8, SLME 70 may be coupled to PMU 78 via control path 166 (e.g., a control path in signal paths 66 of FIG. 7). SLME 70 may generate control signal CTRLA to selectively enable or disable power amplifier 86 based on control commands received over control input 154 and/or the power supply voltages received over power supply inputs 152 and 150. SLME 70 may provide control signal CTRLA to PMU 78 over control path 166.

As an example, PMU 78 may include a regulator such as LDO regulator 164. LDO regulator 164 may be powered by power supply voltage $V_{CC}$ received over power supply input 144. LDO regulator 164 may provide a regulated power supply voltage (e.g., a regulated power supply voltage $V_{CC}$) to power supply input 146 of power amplifier 86. The regulated power supply voltage may power the power amplifier. Control signal CTRLA may control whether or not LDO regulator 164 provides the regulated power supply voltage to power amplifier 86. When SLME 70 determines that power amplifier 86 is an FEM component that is to be powered off in the current operating mode of FEM 40, SLME 70 may control LDO regulator 164 (using control signal CRTLA) to stop providing the regulated power supply voltage to power amplifier 86 or to provide the regulated power supply at a logic low level. This may serve to power off power amplifier 86. In this way, SLME 70 may control LDO regulator 164 to turn off other FEM components on FEM 40 while the LDO regulator itself remains turned on. The example of FIG. 8 is merely illustrative. SLME 70 may control LDO regulator 164 to disable any other desired FEM components. In general, any desired control scheme may be used by SLME 70 to selectively disable the FEM components on FEM 40 for mitigating leakage current in device 10.

The methods and operations described above in connection with FIGS. 1-8 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of front end module 40 or elsewhere (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry on FEM 40, processing circuitry 18 of FIG. 1, etc.). The processing circuitry may include microprocessors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. An electronic device comprising:
   an antenna;
   a transceiver;
   an integrated circuit package having a plurality of front end components and having a first radio-frequency port communicatively coupled to the antenna, a second radio-frequency port communicatively coupled to the transceiver, and a plurality of input ports; and
   a digital controller communicatively coupled to the plurality of input ports and configured to
      operate the plurality of front end components in a first operating mode in which each front end component in the plurality of front end components is supplied with a power supply voltage, and
      based at least in part on a change in one or more monitored voltages at one or more corresponding input ports of the plurality of input ports of the integrated circuit package, operate the plurality of front end components in a second operating mode in which at least one front end component in the plurality of front end components is supplied with the power supply voltage while one or more remaining front end components in the plurality of front end components are disconnected from the power supply voltage.

2. The electronic device of claim 1, wherein the integrated circuit package includes the digital controller.

3. The electronic device of claim 2, the electronic device further comprising a substrate to which the integrated circuit package is mounted, wherein the digital controller is formed on an integrated circuit die in the integrated circuit package.

4. The electronic device of claim 1, wherein the first operating mode is a full-power mode characterized by the antenna transmitting or receiving radio-frequency signals processed by the plurality of front end components.

5. The electronic device of claim 4, wherein the second operating mode is a low power mode, a power off mode, or an autonomous mode.

6. The electronic device of claim 1, wherein each front end component in the plurality of front end components is coupled to a corresponding switch through which the power supply voltage is supplied.

7. The electronic device of claim 1, wherein the plurality of front end components are implemented as part of at least two integrated circuit dies.

8. The electronic device of claim 1, wherein the digital controller is configured to transition the plurality of front end components between the first and second operating modes in response to a trigger condition that is met by the change in the one or more monitored voltages.

9. The electronic device of claim 1, wherein the change in the one or more monitored voltages comprises a change in one or more power supply voltages, including the power supply voltage.

10. The electronic device of claim 1, further comprising:
    a host processor coupled to the digital controller, wherein the digital controller is configured to transition the plurality of front end components between the first and second operating modes based on a host processor command from the host processor.

11. The electronic device of claim 1 further comprising power management circuitry, wherein the digital controller is configured to operate the plurality of front end components in the second operating mode by providing a control signal to the power management circuitry that controls the power management circuitry to disconnect the one or more remaining front end components in the plurality of front end components from the power supply voltage.

12. The electronic device of claim 1, wherein the plurality of front end components comprise a radio-frequency switch, a radio-frequency filter, a low-noise amplifier, a power amplifier, and a radio-frequency coupler.

13. A method of operating radio-frequency circuitry, the method comprising:
    communicating radio-frequency signals via one or more radio-frequency circuits in the radio-frequency circuitry;
    monitoring, at one or more processors, power supply voltages received at respective input ports of the radio-frequency circuitry; and
    decoupling, by the one or more processors and based on the monitored power supply voltages, at least one radio-frequency circuit of the one or more radio-frequency circuits from at least one of the power supply voltages in response to a trigger condition indicative of the radio-frequency circuitry being in a power off mode.

14. The method of claim 13, wherein the trigger condition comprises a change in the power supply voltages.

15. The method of claim 14, wherein the power supply voltages comprise a voltage drain-drain (VDD) power supply voltage and a voltage common collector (VCC) power supply voltage, wherein the change in the power supply voltages comprises a change in the VDD power supply voltage, and wherein the at least one of the power supply voltages comprises the VCC power supply voltage.

16. The method of claim 15, further comprising:
    in response to an additional trigger condition while the at least one radio-frequency circuit is decoupled from the at least one of the power supply voltages, decoupling at least one additional radio-frequency circuit of the one or more radio-frequency circuits from the VCC power supply voltage.

17. The method of claim 13, wherein the trigger condition comprises receiving a host command transmitted by a host processor external to the radio-frequency circuitry.

18. The method of claim 13, wherein the radio-frequency circuitry comprises a low-dropout (LDO) regulator and wherein decoupling the at least one radio-frequency circuit from the at least one of the power supply voltages comprises controlling the LDO regulator to decouple the at least one radio-frequency circuit from the at least one of the power supply voltages.

19. A non-transitory computer-readable storage medium storing one or more programs configured to be executed by at least one processor, the one or more programs including instructions that, when executed by the at least one processor, cause the at least one processor to:
monitor a first power supply voltage received by a first supply voltage input port of an integrated circuit package, the integrated circuit package having a plurality of radio-frequency front end circuits and having a first radio-frequency port configured to communicatively couple the plurality of radio-frequency front end circuits to an antenna and a second radio-frequency port configured to communicatively couple the plurality of radio-frequency front end circuits to a transceiver; and
decouple, based at least in part on the monitoring, at least one radio- frequency front end circuit of the plurality of radio-frequency front end circuits from a second power supply voltage received by a second supply voltage input port of the integrated circuit package.

20. The non-transitory computer-readable storage medium of claim 19, wherein the decoupling of the at least one radio-frequency front end circuit is in response to a change of the first power supply voltage from a first logic level to a second logic level lower than the first logic level.

* * * * *